No. 735,094. PATENTED AUG. 4, 1903.
S. GUTH.
REVERSING GEAR.
APPLICATION FILED MAY 25, 1903.
NO MODEL.
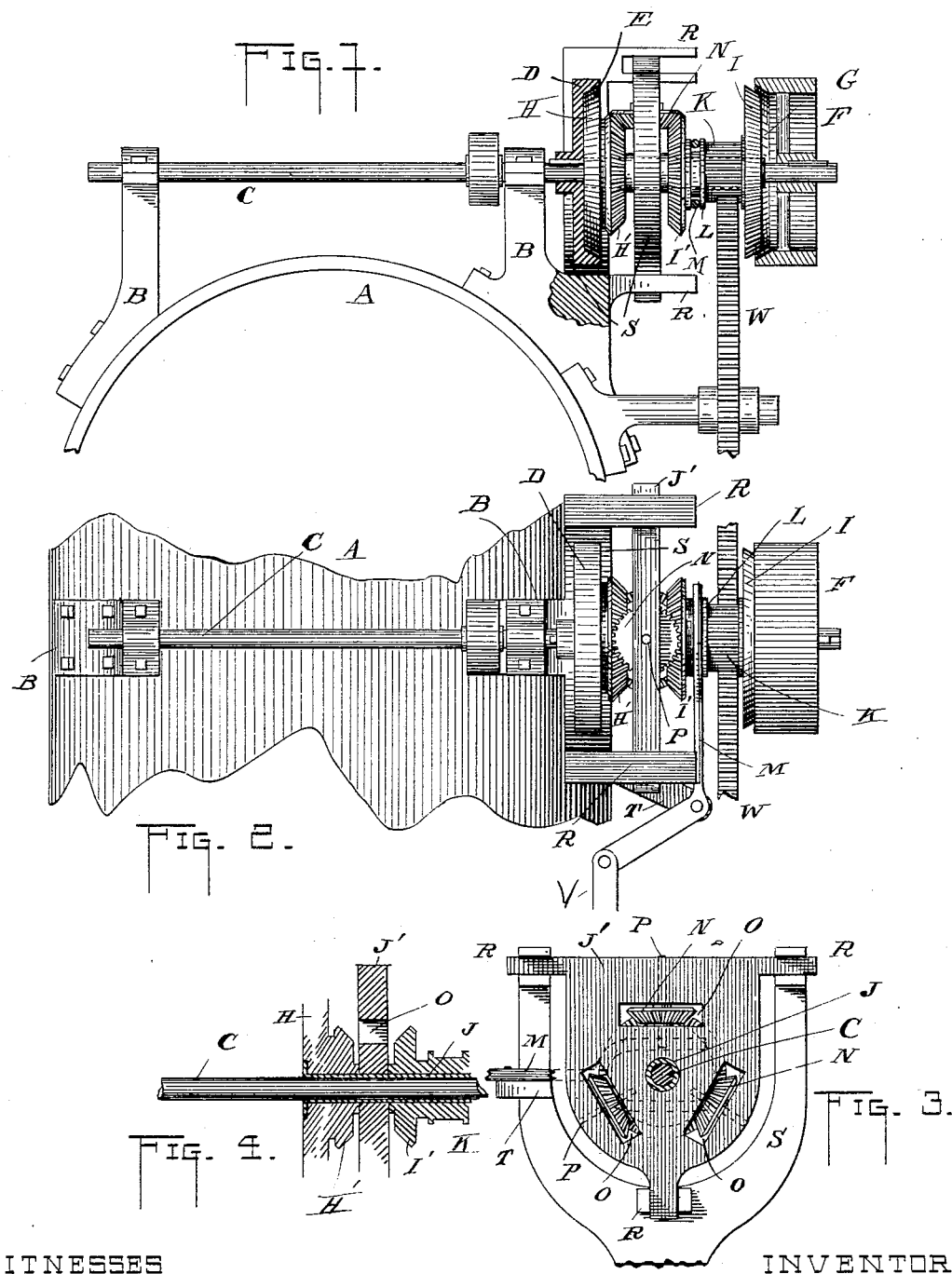
WITNESSES
INVENTOR
Samuel Guth,
By L. W. Thurlow,
Att'y.

No. 735,094.

Patented August 4, 1903.

UNITED STATES PATENT OFFICE.

SAMUEL GUTH, OF WASHINGTON, ILLINOIS.

REVERSING-GEAR.

SPECIFICATION forming part of Letters Patent No. 735,094, dated August 4, 1903.

Application filed May 25, 1903. Serial No. 158,578. (No model.)

*To all whom it may concern:*

Be it known that I, SAMUEL GUTH, a citizen of the United States, residing at Washington, in the county of Tazewell and State of Illinois, have invented certain new and useful Improvements in Reversing-Gear; and I do hereby declare that the following is a full, clear, and exact description of the invention, which will enable others skilled in the art to which it appertains to make and use the same.

This invention relates to reversing-gear mechanism for use on engines, but more particularly for traction-engines.

The object of the invention is to provide a simple form of reversing-gear for traction-engines combining strength and rigidity.

A further object is to provide a new structure and a new combination of parts in a reversing-gear.

In the accompanying drawings, Figure 1 is a front elevation of a portion of an engine, showing my improved reversing-gear mounted thereon. Fig. 2 is a plan view of the same. Fig. 3 is a view of a guide for carrying certain idler gears or pinions. Fig. 4 is a longitudinal section of two gears and the guide shown in Fig. 3, showing a carrying-shaft and sleeve on which the said gears and guide are mounted.

In Figs. 1 and 2 the engine is represented by the letter A. Above it and journaled thereon by means of the bearings B B is a horizontal shaft C. On this shaft is mounted my improved reversing-gear, consisting first of a friction-wheel D, having a tapering recess E. Said wheel is keyed fast to the shaft, and therefore revolves with it. At the outer end of the shaft is a pulley F, to be belted to the thresher or other machine to be driven. This pulley is recessed at G in substantially the same manner as the wheel D, each of these members thus constructed being designed to receive a friction-disk, these being represented by the letters H and I. These disks are mounted on a sleeve J, surrounding the shaft C, as shown in broken lines in Fig. 1 and in section in Fig. 4. Secured to or forming a part of the wheel or disk H is a beveled gear H', and formed with the disk I is a similar beveled gear I', and between said disk and gear is a spur-gear K, and adjoining this is a shifting device L, straddled by a shifting fork M, to be more fully described. These several portions are designed to revolve together, as does the gear H' and its disk H. Between the gears H' and I', thus described, is a shifting member J', fitting around the sleeve J, as indicated in Fig. 4. This member carries a series of beveled pinions N in slots O by means of suitable pins P. At Q are lugs or projections on the member J', which are guided in forked extremities R of a yoke S, formed with or secured to the bearing B, adjacent to the friction-plate D. The pinions N are arranged so that they are in engagement with both the gears on the sleeve J, so that motion imparted to one of said gears will transmit a reverse movement to the opposite gear through said pinions. The disks, together with their parts and the shifting member J', are arranged in a compact manner upon the sleeve J, so that all of them when moved along the shaft move together. The ends of the said sleeve J are flanged, as shown in Fig. 4, so that all said parts are kept close together and move as one body. The gears H' and I' are provided with projecting hubs $H^2$ and $I^2$, respectively, which bear against the member J' and serve to shift that member in either direction, thus insuring a uniform relation between the said gears and the pinions N, as will be understood. A lug or projection T on the yoke S carries a shifting fork M, hereinbefore referred to, and to said fork is attached a suitable pull-rod V, by which the fork may be shifted in either direction to throw one or the other of the friction-disks into the friction-wheels.

The operation of the device is as follows: Power being applied to the shaft from the engine drives said shaft in one direction continually, no reversing mechanism on the engine being used. If the shaft revolves away from the observer, the friction-wheel D and the pulley F will likewise revolve in that direction, since they are keyed to the shaft, as before explained. If at this time the shifting fork is moved to place the shifting members midway between the wheel and pulley described, no action will result, since both the friction-plates will be free; but if the fork be shifted to throw the plate H into the wheel D motion will be imparted to the said plate and the gear H' away from the observer, and the result will be that through the pinions N the gear I' will turn toward the observer, as also will the spur-gear K, which is in mesh with an idler W, which drives the gearing of the engine to make the latter portable on its own carrying-wheels. The engine will therefore move on its said carrying-wheels in one direction or the other. If the fork U now be reversed, so that the plate H is disengaged from D, and the plate I be put in engagement with the pulley F, the said spur-gear K will revolve in the contrary direction and move the engine in the direction opposite to that last mentioned. By reason of the several members H, H', S, I', and I being mounted on the sleeve J they must all move together, as will be clearly understood, and since the portion S is guided in the forked extremities R it must move freely in the plane in which it lies without any binding or shifting out of that plane. The construction is extremely simple, is durable, and most effective in operation.

It is evident that if it is desired to reverse the movement of the thresher or other machines to which the power is transmitted through the pulley F it is only necessary to twist the belt to accomplish it; but in reversing the direction of movement of the portable engine a mechanism such as I describe must be employed.

I claim—

1. A reversing mechanism for traction-engines comprising a shaft, two friction-wheels affixed to the shaft to revolve therewith, a pair of beveled gears loosely mounted on the shaft between the said friction-wheels, idler-pinions meshing with both gears, means for carrying such idlers, the gears and the idler-carrying means adapted to shift longitudinally along the shaft, a friction-plate carried by each gear and adapted to engage the friction-wheels as set forth means on the shaft for connection with the carrying-wheels of the engine for driving the same and means for shifting the friction devices.

2. In a reversing-gear for traction-engines, the shaft C mounted on the engine, and driven therefrom, two friction-wheels D and G affixed to said shaft, the sleeve J on said shaft between said wheels, the combined gear H' and friction-plate H on said sleeve, the combined gear I', wheel K and wheel I also on said sleeve, the member J' between the said gears, the idlers N carried therein and meshing with both the gears H' and I' all said members adapted to shift along the shaft with the sleeve, between the friction-wheels means between the gear K and the carrying-wheels of the engine for driving said wheels, and means for shifting the gears H' and I' and their friction-plates to carry the latter into engagement with the friction-wheels as set forth and for the purposes described.

3. A reversing mechanism for traction-engines comprising a shaft on the engine, two oppositely-faced beveled friction-wheels secured on said shaft, a sleeve surrounding the shaft between the friction-wheels, a friction-plate and beveled gear on the sleeve between the said friction-wheels, said plate and gear revolving together, a second beveled gear and friction-plate also between the friction-wheels and also carried on the sleeve, both said gears adapted to revolve in opposite directions, idler-gears meshing with both the gears, a vertically-arranged plate slidably carried on the engine for carrying the idlers, means for shifting the gears and plate and consequently the idler-gears to engage one or the other of the friction-plates with the friction-wheels as set forth, and a gear connected with one of the gears and having connection with the carrying-wheels of the engine for driving the same substantially in the manner described.

In testimony whereof I affix my signature in presence of two witnesses.

SAMUEL GUTH.

Witnesses:
 L. M. THURLOW,
 A. KEITHLEY.